United States Patent
Orito

[19]

[11] Patent Number: 6,072,912
[45] Date of Patent: Jun. 6, 2000

[54] IMAGE READING-AND-TRANSFERRING SYSTEM UTILIZING COMPUTER CORRECTION OF TONE DATA

[75] Inventor: Yoshiko Orito, Bisai, Japan

[73] Assignee: Brother Kogyo Kabushiki Kaisha, Nagoya, Japan

[21] Appl. No.: 08/667,862

[22] Filed: Jun. 20, 1996

[30] Foreign Application Priority Data

Jun. 21, 1995 [JP] Japan ................................. 7-179445

[51] Int. Cl.[7] ........................................ H04N 1/40
[52] U.S. Cl. .................. 382/274; 358/442; 358/461; 358/521
[58] Field of Search ................... 358/518–521, 358/442, 468, 461, 464, 504, 406; 382/270, 272–274, 167; 395/106, 114, 1.15, 1.6; H04N 1/60, 1/40

[56] References Cited

U.S. PATENT DOCUMENTS

| | | | |
|---|---|---|---|
| 5,038,225 | 8/1991 | Maeshima | 358/461 |
| 5,115,478 | 5/1992 | Sugiura | 382/274 |
| 5,202,773 | 4/1993 | Kato | 358/461 |
| 5,383,032 | 1/1995 | Eguchi et al. | 358/448 |
| 5,430,559 | 7/1995 | Hirota | 358/516 |
| 5,453,845 | 9/1995 | Nonoshita et al. | 358/406 |
| 5,532,849 | 7/1996 | McIntyre et al. | 358/523 |
| 5,568,284 | 10/1996 | Oku et al. | 358/520 |
| 5,592,218 | 1/1997 | Ochiai et al. | 348/251 |
| 5,719,965 | 2/1998 | Degi et al. | 358/504 |
| 5,917,619 | 6/1999 | Yamagata et al. | 358/504 |

*Primary Examiner*—Kim Yen Vu
*Attorney, Agent, or Firm*—Oliff & Berridge, PLC

[57] ABSTRACT

An image scanner produces white level data when the white plate is irradiated with light. The image scanner produces black level data when the white plate is irradiated with no light. Correction data constructed from the thus produced white level data and black level data is transferred to the host computer. Next, the image scanner produces tone data for the original, and transfers the tone data to the host computer. In the host computer, the tone data is corrected into either one of the 256 levels "00" to "FF." This correction operation is attained with using average values of the transferred white level data and average values of the transferred black level data.

22 Claims, 7 Drawing Sheets

20a (73a) — 1648 PIXELS

| | FIRST PIXELS | SECOND PIXELS | THIRD PIXELS | |
|---|---|---|---|---|
| FIRST | 1 W A 1 | 1 W A 2 | 1 W A 3 | ---------- |
| SECOND | 2 W A 1 | 2 W A 2 | 2 W A 3 | ---------- |
| THIRD | 3 W A 1 | 3 W A 2 | 3 W A 3 | ---------- |
| | | | | |
| EIGHTH | 8 W A 1 | 8 W A 2 | 8 W A 3 | ---------- |
| WHITE LEVEL AVERAGE | (W1) | (W2) | (W3) | ---------- |

FIG. 9

20b (73b) — 1648 PIXELS

| | FIRST PIXELS | SECOND PIXELS | THIRD PIXELS | |
|---|---|---|---|---|
| FIRST | 1 B A 1 | 1 B A 2 | 1 B A 3 | ---------- |
| SECOND | 2 B A 1 | 2 B A 2 | 2 B A 3 | ---------- |
| THIRD | 3 B A 1 | 3 B A 2 | 3 B A 3 | ---------- |
| | | | | |
| EIGHTH | 8 B A 1 | 8 B A 2 | 8 B A 3 | ---------- |
| BLACK LEVEL AVERAGE | (B1) | (B2) | (B3) | ---------- | ns
IMAGE READING-AND-TRANSFERRING SYSTEM UTILIZING COMPUTER CORRECTION OF TONE DATA

BACKGROUND OF THE INVENTION

1. Field of the Invention

The present invention relates to a method and system for reading image data from an original with an image scanner and for transferring the image data to a host computer.

2. Description of the Related Art

In one example of the image reading and transferring system, an image scanner is connected via a connection cable to a host computer. The image scanner is provided with a reading mechanism for optically reading image information from an original and for producing image data. The image scanner is provided with a transmission/reception circuit which includes a Centronics communication port to which a Centronics connector is connected for connecting to the connection cable. The Centronics communication port and the Centronics connector are for transmitting and receiving parallel data to and from an external device. The image scanner can therefore transmit image data in parallel to the host computer via the connection cable.

The host computer is constructed from a personal computer, for example. The host computer is also provided with a transmission/reception circuit which includes a Centronics communication port to which is connected a Centronics connector for connecting to the connection cable. The host computer can therefore receive parallel image data transmitted via the connection cable from the image scanner. The host computer is constructed to be capable of transmitting the received image data further to a printer device such as a laser printer. The host computer can produce image data by itself and can transmit the image data to the printer device.

SUMMARY OF THE INVENTION

In the image scanner, the original is transported along a predetermined original transportation path. An irradiation lamp is disposed in the original transportation path for irradiating the original with light. An image sensor is disposed for receiving the light reflected from the original and for reading an image of the original. The image sensor is made up of a plurality of, for example, 1648 CCDs (charge coupled devices) aligned in a direction traversing the original transportation path. The image sensor reads out successive lines of the original and produces successive sets of image data while the original is transported along the transportation path. In other words, the image sensor scans 1648 picture elements (pixels) on the original in a main scanning direction while the original is transported in an auxiliary scanning direction orthogonal to the main scanning direction. Each set of the thus produced successive sets of image data is constructed from 1648 pieces of tone data produced by first through 1648-th CCDs. When the original image is a gray scale image, i.e., a tone image, each tone data is constructed from, for example, one byte of density data.

It is noted, however, that the CCDs may not produce the same value of tone data even when detecting the same tone on the original. This is because each CCD has different electronic conversion characteristics. Even a single CCD may produce different values of tone data when the intensity of the irradiation light varies.

It is therefore conceivable to provide the image reading-and-transferring system wherein the image scanner corrects the CCDs' produced tone data so that the tone data will properly indicate the tone of the corresponding pixel. The image scanner transfers the corrected tone data to the host computer.

The tone data correction operation will be described below.

A white plate is provided in the original transportation path. Before reading the original, the image sensor scans the white plate eight times in the main scanning direction while the white plate is irradiated with irradiation light. The image sensor produces eight sets of white level or white tone data. Each set of white level data includes 1648 pieces of white level data obtained by the first through 1648-th CCDs. Accordingly, the eight sets of white level data include: eight pieces of white level data obtained by the first CCD, eight pieces of white level data obtained by the second CCD, . . . , and eight pieces of white level data obtained by the 1648-th CCD. Then, a mean value W1 is calculated for the eight pieces of white level data obtained by the first CCD. Similarly, a mean value W2 is calculated for the eight pieces of white level data obtained by the second CCD. Thus, a mean value Wn is calculated for the eight pieces of white level data obtained by the n-th CCD where $1 \leq n \leq 1648$. Thus, white level mean values W1, W2, . . . , and W1648 are calculated for the first through 1648-th CCDs.

Next, in the similar manner as described above, the sensor again scans the white plate eight times while the white plate is irradiated with no irradiation light. The image sensor produces eight sets of black level or black tone data. Each set of black level data includes 1648 pieces of black level data obtained by the first through 1648-th CCDs. Accordingly, the eight sets of black level data include: eight pieces of black level data obtained by the first CCD, eight pieces of black level data obtained by the second CCD, . . . , and eight pieces of black level data obtained by the 1648-th CCD. Then, a mean value B1 is calculated for the eight pieces of black level data obtained by the first CCD. Similarly, a mean value B2 is calculated for the eight pieces of black level data obtained by the second CCD. Thus, a mean value Bn is calculated for the eight pieces of black level data obtained by the n-th CCD where $1 \leq n \leq 1648$. Thus, black level mean values B1, B2, . . . , and B1648 are calculated for the first through 1648-th CCDs.

Next, the original is transported in the transportation path, and the image scanner is controlled to successively scan the original to produce successive lines' worth of image data. Thus produced each line's worth of data includes 1648 pieces of tone data P produced by the first through 1648-th CCDs. Each tone data Pn (where $1 \leq n \leq 1648$) of each set is then corrected with a correction formula Fn, which is determined dependent on the corresponding white level mean value Wn and the corresponding black level mean value Bn. Then, the tone data Pn is corrected into either one of 256 tone levels. This correction operation is performed every time the image scanner produces one line's worth of image data.

It is noted, however, that the image scanner is produced mainly for reading image data and for transferring the image data to the host computer. Accordingly, a CPU employed in the image scanner is generally produced for calculating a small amount of data, for example, 8 bits of data. The above-described correction operations place a large burden on this small-scale CPU. Because this correction operation is performed every time one set of image data is produced, it takes a long time to read the entire image, and accordingly, the entire transfer speed becomes lowered.

It is therefore, an object of the present invention to overcome the above-described drawbacks, and to provide an improved image reading-and-transferring system in which the image reading and transferring operation can be performed within a short period of time.

In order to attain the object and other objects, the present invention provides an image reading system for reading an original and producing tone data representative of the original, the system comprising: an image scanner for reading an original and for producing tone data, the image scanner including: an image sensor capable of detecting a tone and of producing tone data representative of the detected tone; correction data production means for controlling the image sensor to read a predetermined tone and to produce correction data representative of the predetermined tone; original data production means for controlling the image sensor to read an original desired to be read and to produce tone data representative of the original; and data transferring means for transferring the correction data and the tone data; and a host computer for receiving the correction data and the tone data, the host computer including: reception means for receiving the correction data and the tone data transferred from the image scanner; and correction means for correcting the tone data with using the correction data.

According to another aspect, the present invention provides an image reading system for reading an original and producing tone data representative of the original, the system comprising: an image scanner for reading an original desired to be read and for producing tone data, the image scanner including: an image sensor capable of scanning an entire width of an original along a main scanning direction and of producing a set of tone data representative of a tone on the entire width of the original; correction data production means for controlling the image sensor to scan a white plate, which is provided to extend in the main scanning direction along the entire width of the original, and to produce a set of white level correction data representative of the white tone on the white plate along the main scanning direction; original data production means for controlling the image sensor to scan the entire width of the original along the main scanning direction and to produce a set of tone data representative of the tone on the original along the main scanning direction; and data transferring means for successively transferring the set of white level correction data and the set of tone data; and a host computer for receiving the set of correction data and the set of tone data, the host computer including: reception means for receiving the set of correction data and the set of tone data transferred from the image scanner; and correction means for correcting the set of tone data with using the set of correction data.

According to a further aspect, the present invention provides a method of reading an original and producing tone data representative of the original, the method comprising the steps of: controlling an image scanner to read a predetermined tone and to produce correction data representative of the predetermined tone; controlling the image scanner to read an original desired to be read and to produce tone data representative of the original; controlling the image scanner to transfer the correction data and the tone data to a host computer; and controlling the host computer to correct the tone data with using the correction data.

According to still another aspect, the present invention provides a method of reading an original and producing tone data representative of the original, the method comprising the steps of: controlling an image sensor, which is capable of scanning an entire width of an original along a main scanning direction and of producing a set of tone data representative of a tone on the entire width of the original, to scan a white plate, which is provided to extend in the main scanning direction along the entire width of the original, and to produce a set of white level correction data representative of the white tone on the white plate along the main scanning direction; controlling the image scanner to scan the entire width of the original along the main scanning direction and to produce a set of tone data representative of the tone on the original along the main scanning direction; controlling the image scanner to successively transfer the set of white level correction data and the set of tone data to a host computer; and controlling the host computer to correct the set of tone data with using the set of white level correction data.

According to a further aspect, the present invention provides a method of reading an original and producing tone data representative of the original, the method comprising the steps of: controlling an image sensor, which is capable of scanning an entire width of an original along a main scanning direction and of producing a set of tone data representative of a tone on the entire width of the original, to scan a white plate, which is provided to extend in the main scanning direction along the entire width of the original, and to produce a set of white level correction data representative of the white tone on the white plate along the main scanning direction; controlling the image scanner to successively transfer the set of white level correction data to a host computer; controlling the image scanner to scan the entire width of the original along the main scanning direction and to produce a set of tone data representative of the tone on the original along the main scanning direction; controlling the image scanner to successively transfer the set of tone data to a host computer; and controlling the host computer to correct the set of tone data with using the set of white level correction data.

BRIEF DESCRIPTION OF THE DRAWINGS

The above and other objects, features and advantages of the invention will become more apparent from reading the following description of the preferred embodiment taken in connection with the accompanying drawings in which.

DETAILED DESCRIPTION OF THE PREFERRED EMBODIMENT

An image reading-and-transferring system according to a preferred embodiment of the present invention will be described while referring to the accompanying drawings wherein like parts and components are designated by the same reference numerals.

Figure 1:
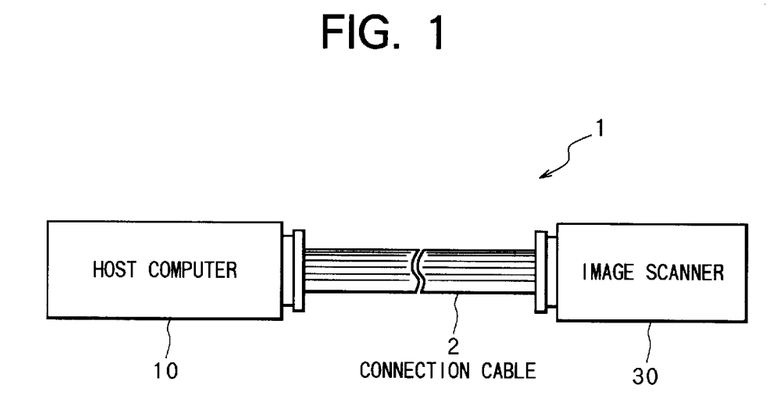
FIG. 1 is a schematic view of an image reading-and-transferring system of an embodiment of the present invention.

FIG. 1 shows an image reading-and-transferring system 1 of the present embodiment. In the image data reading-and-transferring system 1, a host computer 10 is connected with an image scanner 30 via a connection cable 2. The image scanner 30 is for reading out a tone image from an original document and for producing image data. The image reading-and-transferring system 1 is for transferring the image data in parallel from the image scanner 30 to the host computer 10 according to IEEE1284 communication interface standards.

Figure 3:
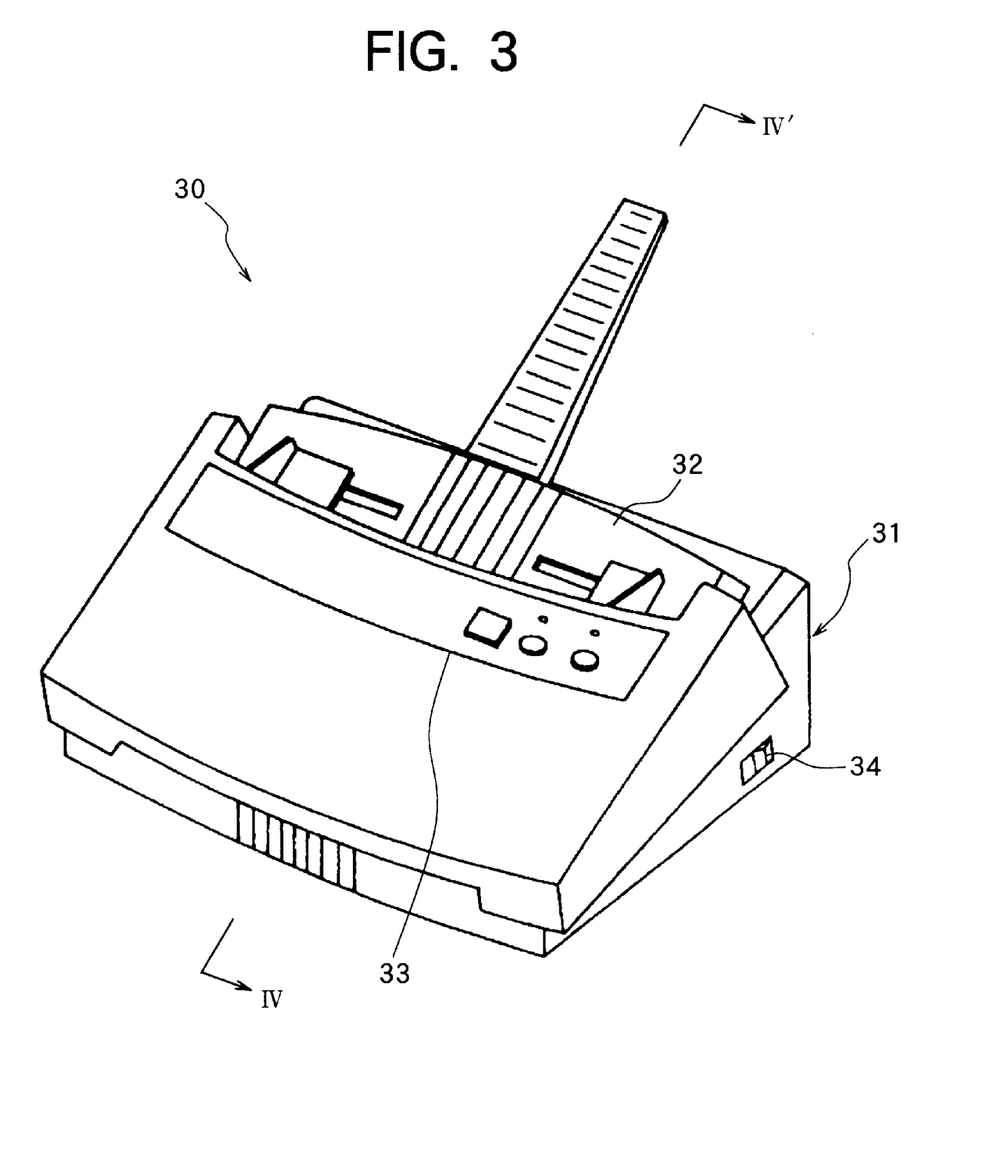
FIG. 3 is a perspective view of an image scanner employed in the system of FIG. 1.
Figure 4:
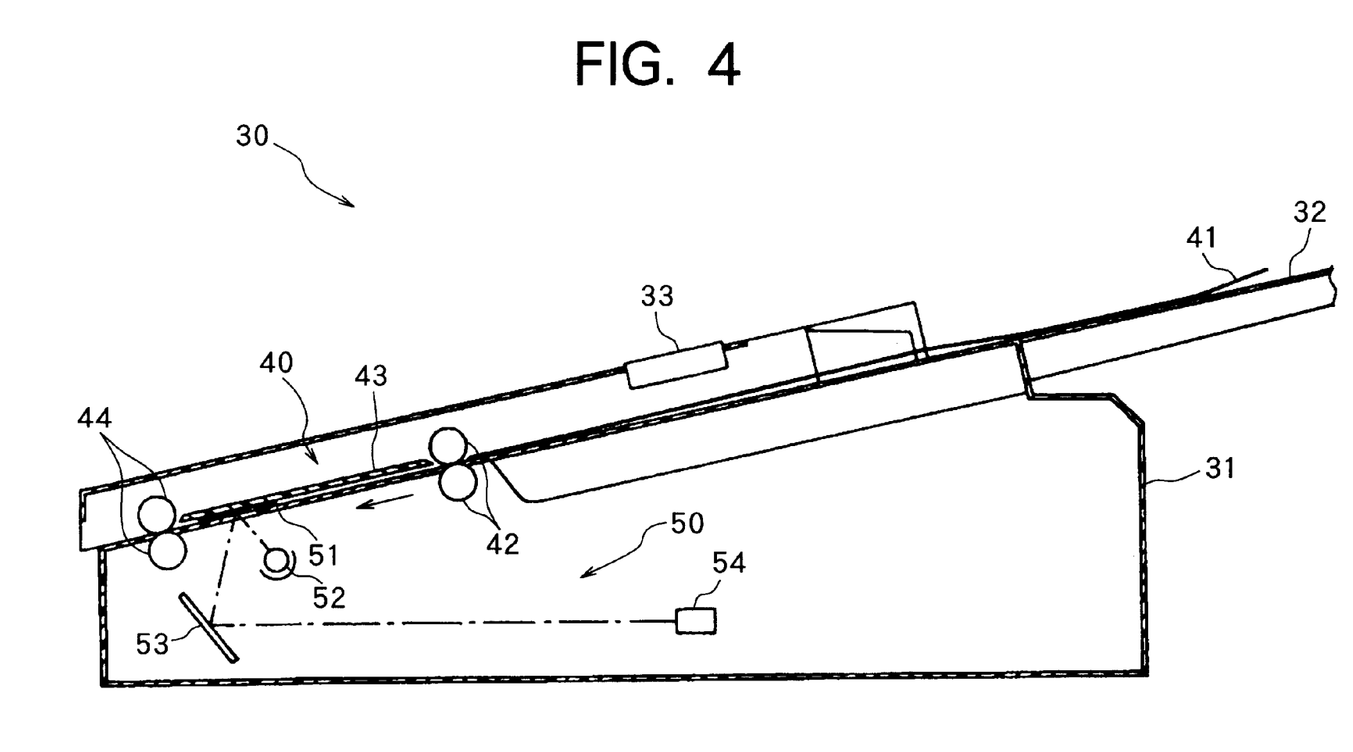
FIG. 4 is a sectional side view of the image scanner taken along a line IV-IV' in FIG. 3.

FIG. 3 is an external perspective view of the image scanner 30. The image scanner 30 includes a paper holder 32 for supporting a stack of original documents. An original transporting mechanism 40 shown in FIG. 4 is housed in a frame 31. A power switch 34 is provided in the side frame, and an operation panel 33 is provided in the upper frame. Operation switches including a copy switch are provided on the operation panel 33.

As shown in FIG. 4, in the original transporting mechanism 40, a pair of feed rollers 42 separate a lowermost original document 41 from a stack in the paper holder 32 and feeds the original document 41 inside the image scanner 30. The original document 41 is transported along a transportation path which is defined below and along a guide plate 43. The original document 41 is therefore transported along the transportation path in an auxiliary scanning direction indicated by an arrow in the drawing. A pair of discharge rollers 44 located on the downstream of the guide plate 43 discharges the original document 41 out of the image scanner 30.

An image reading mechanism 50 is provided in the image scanner 30. In the image reading mechanism 50, a white plate 51 is attached to the lower side surface of the guide plate 43. The white plate 51 is provided spanning in a main scanning direction, which is orthogonal to the auxiliary scanning direction, the entire width of the original transport path. An irradiation lamp 52 is located for irradiating the white plate 51. It is noted that when an original document 41 is being transferred below the guide plate 43 along the transport path, the irradiation lamp 52 irradiates the original document 41 with light. A mirror 53 is located for reflecting the light from the white plate 51 and the original document 41. An image sensor 54 is provided for detecting light reflected from the mirror 53. The image sensor 54 is made up of a plurality of image sensing elements aligned in a direction parallel to the main scanning direction. For example, the image sensor 54 is made up of 1648 CCDs (charge coupled devices). When the white plate 51 is irradiated with light, the image sensor 54 will produce one line's worth of white level data consisting of 1648 pieces of white level or white tone data. When the white plate 51 is irradiated with no light, the image sensor 54 will produce one line's worth of black level data consisting of 1648 pieces of black level or black tone data. When the original document 41 is irradiated with light, the image sensor 54 will produce one line's worth of tone data consisting of 1648 pieces of tone data representing degrees of lightness and darkness between and including black and white. Each tone data represents a tone of a corresponding one of 1648 picture elements aligned on the original document 41 in the main scanning direction.

Figure 5:
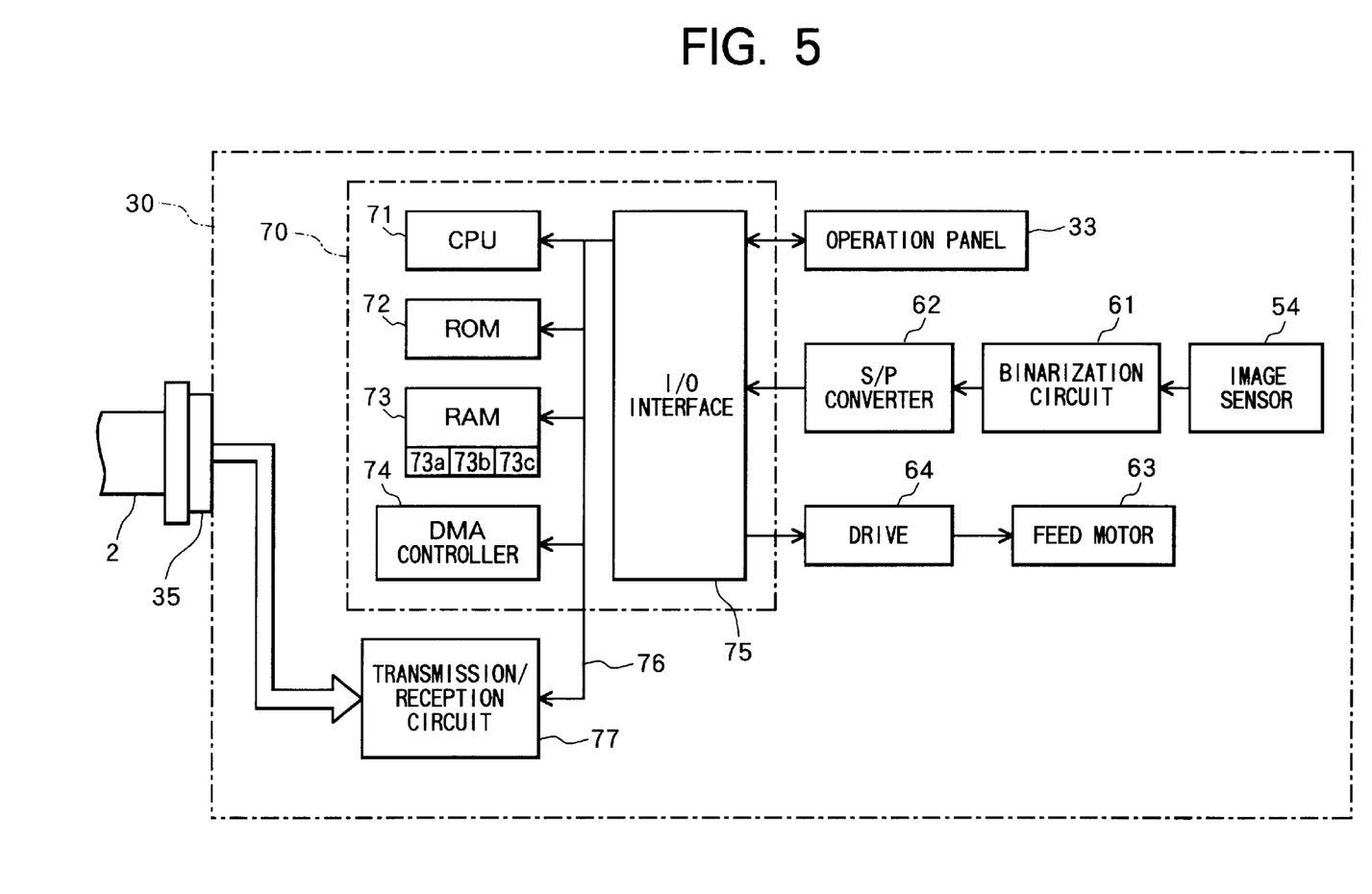
FIG. 5 is a block diagram of a control system of the image scanner employed in the system of FIG. 1.

The image scanner 30 incorporates a control system as shown in block form in FIG. 5. The image scanner 30 includes a control unit 70, in which a CPU (central processing unit) 71 is connected via a control bus 76 to: an input/output interface 75, a ROM (read-only memory) 72, a RAM (random access memory) 73, and a DMA (direct memory access) controller 74.

The CPU 71 is further connected via the control bus 76 to the transmission/reception circuit 77. The transmission/reception circuit 77 is provided with a Centronics communication port which is capable of transmitting and receiving image data to and from the host computer 10 according to IEEE1284 communication interface standards. The transmission/reception circuit 77 is connected with a Centronics connector 35 which is in turn connected to the host computer 10 via the connection cable 2.

To the input/output interface 75 are connected: an S/P (serial-to-parallel) converter 62, the switches on the control panel 33, a driver circuit 64, the light source 52 (not shown in the drawing), a cover open detection switch (not shown) and the like. The S/P converter 62 is connected via a binarization circuit 61 to the image sensor 54. When the image sensor 54 scans the original document 41 or the white plate 51 and serially produces a set of analog data (a set of tone data, a set of white level data, or a set of black level data), the binary circuit 61 digitalizes the set of data into a set of digital data, and the S/P converter 62 converts the set of serial data into a set of parallel data. The driver 64 is for driving an original feed motor 63 for driving the rollers 42 and 44.

The RAM 73 is formed with: a white level memory 73a (shown in FIG. 8) for storing eight sets of white level data read out by the image sensor 54; and a black level memory 73b (shown in FIG. 9) for storing eight sets of black level data also read out by the image sensor 54; and an image data memory 73c for storing successive sets of tone data read out by the image sensor 54. The RAM 73 is also formed with other various memories used for reading out image data from the original document.

The DMA (direct memory access) controller 74 is for transferring data at a high rate without being controlled by the CPU 71. The DMA controller 74 is an interface circuit of the special hardware for direct transfer of data between a memory and another device. In the DMA controller, data is not subjected to a program-controlled transfer operation performed by the CPU, but is directly transferred between the memory and the device. The DMA controller can therefore attain a high speed data transfer operation. In the present embodiment, the DMA controller 74 is connected to: the RAM 73 and the transmission/reception circuit 77. The CPU 71 controls the DMA controller 74 to perform direct transfer operation between the memories 73a–73c and the transmission/reception circuit 77.

The ROM 72 stores therein various data processing programs and a control program for transmitting and receiving image data in parallel according to IEEE1284 communication interface standards.

Figure 2:
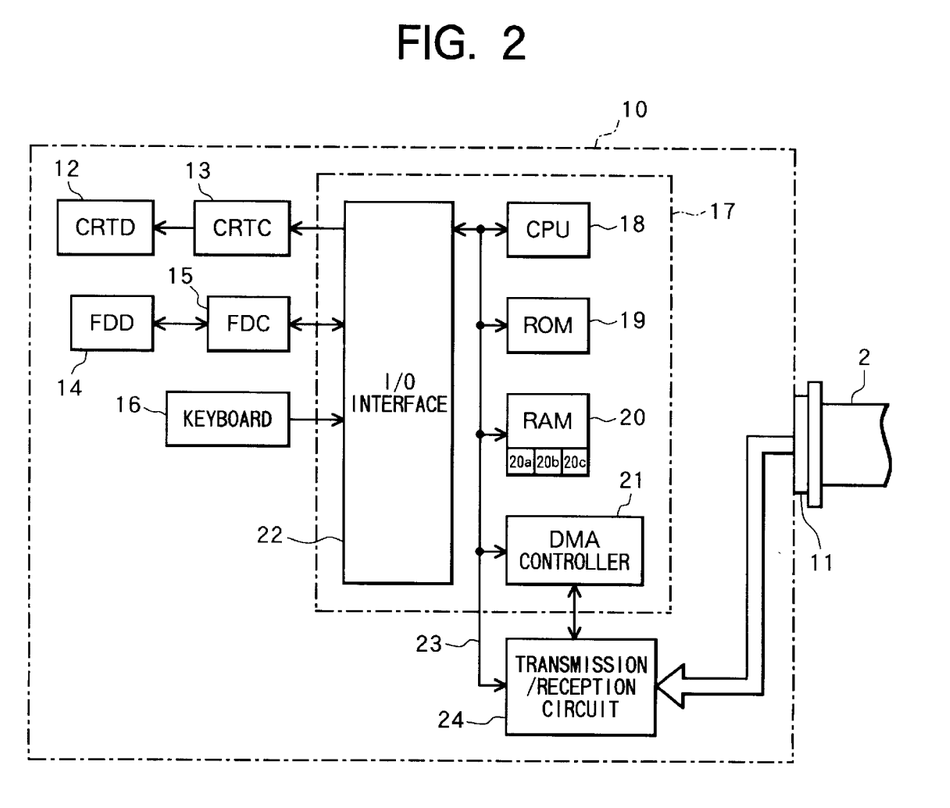
FIG. 2 is a block diagram of a control system of a host computer employed in the system of FIG. 1.

FIG. 2 is a block diagram of a control system provided in the host computer 10.

The host computer 10 includes a control device 17. In the control device 17, a central processing unit (CPU) 18 is connected via a control bus 23 to: an input/output interface 22, a read-only memory (ROM) 19, a random-access memory (RAM) 20, and a DMA (direct memory access) controller 21.

The CPU 18 is further connected via the control bus 23 to a transmission/reception circuit 24. The transmission/reception circuit 24 is provided with a Centronics communication port which is capable of transmitting and receiving in parallel image data to and from the image scanner 30 according to IEEE1284 communication interface standards. The transmission/reception circuit 24 is connected with a Centronics connector 11 which is in turn connected to the image scanner 30 via the connection cable 2.

The ROM 19 stores therein various data processing programs and a control program for transmitting and receiving image data in parallel according to IEEE1284 communication interface standards.

Figure 8:
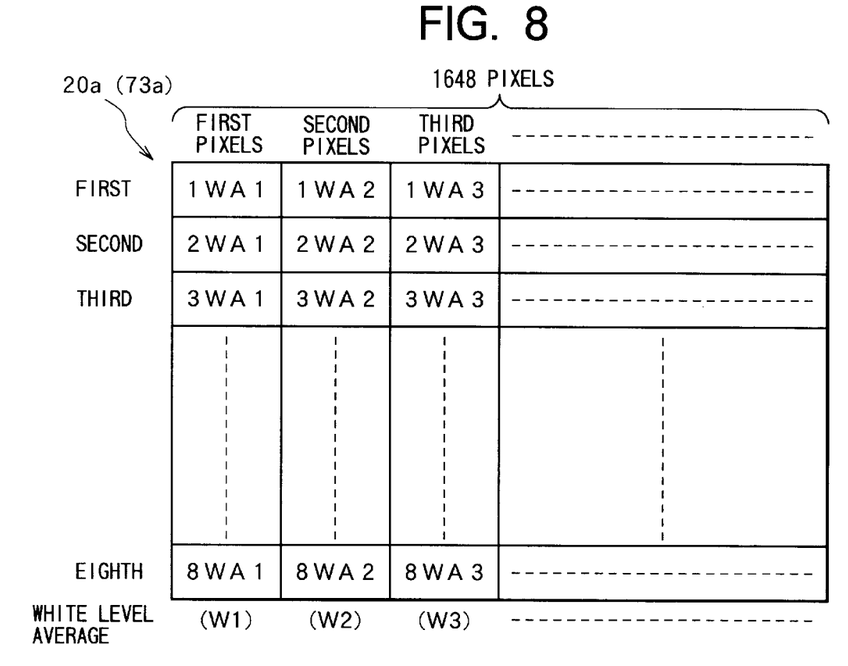
FIG. 8 illustrates eight sets of white level data produced by the eight scanning operations for an irradiated white plate.

The RAM 20 is formed with: a white level memory 20a for storing eight sets of white level data transferred from the image scanner 30; a black level memory 20b for storing eight sets of black level data also transferred from the image scanner; and a tone data memory 20c for storing successive sets of tone data also transferred from the image scanner 30. The memory 20a stores the eight sets of white level data in the same manner as the memory 73a as shown in FIG. 8. The memory 20b stores the eight sets of black level data in the same manner as the memory 73b shown in FIG. 9. The RAM 20 is formed with several memories for storing data obtained during various data processing operations.

The DMA controller 21 is for transferring data at a high rate without being controlled by the CPU 18.

The input/output interface 22 is connected to: a CRT controller (CRTC) 13 for outputting character data and symbol data to a CRT display (CRTD) 12; a floppy disk controller 15 for controlling a floppy disk drive (FDD) 14; and a keyboard 16.

Figure 6:
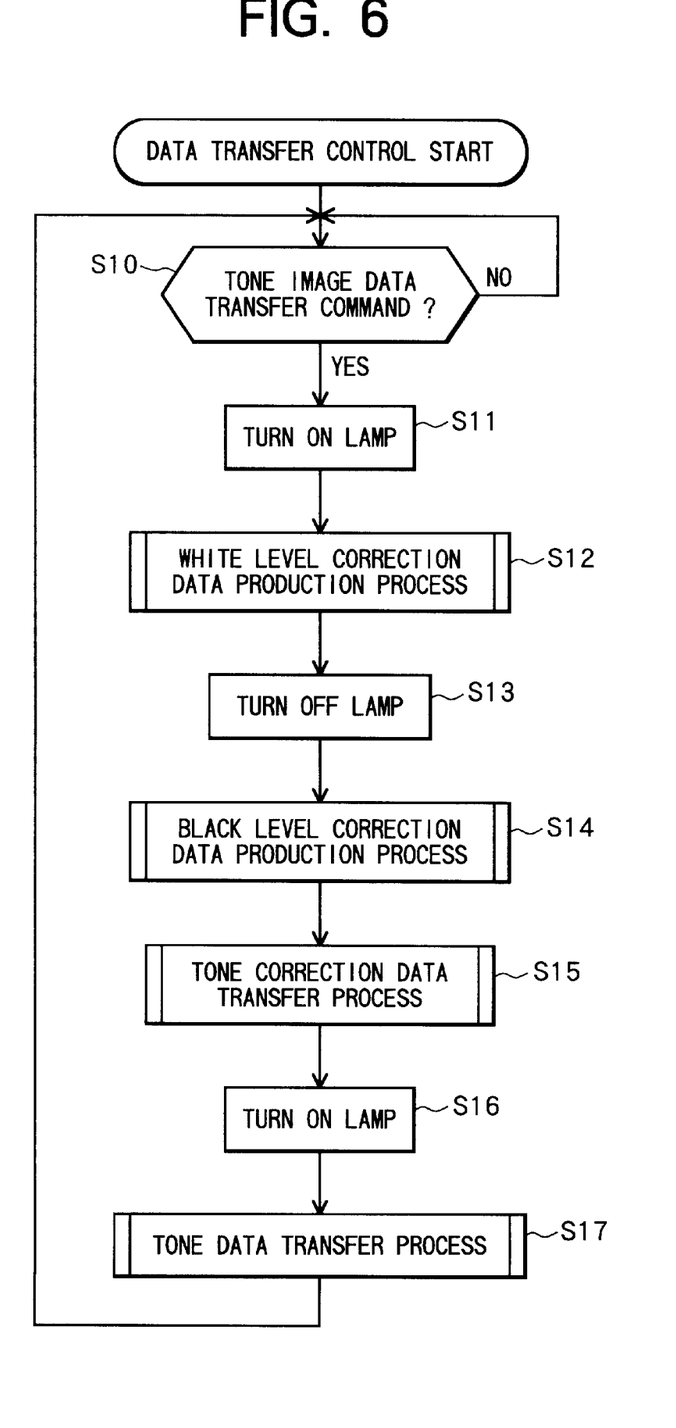
FIG. 6 is a flowchart of an image data transfer control operation conducted in the image scanner.

With the above-described structure, the control device 70 in the image scanner 30 performs an image data transfer control operation shown in FIG. 6. Individual steps in the flowchart will be represented as Si, wherein i is the number of the step (i.e., i=10, 11, . . . i).

When the power switch 34 is turned on, several initialization steps are performed. Then, the image data transfer control operation shown in FIG. 6 is started. First, in an idling state, the CPU 71 repeatedly judges in S10 whether or not data transmission command is received from the host computer 10. When the transmission command is received ("Yes" in S10), the CPU 71 turns on the irradiation lamp 52 in S11, and the CPU 71 starts a white level data production process in S12.

In this white level data production process, no original document 41 is fed in the transportation path, but the white plate 51 is irradiated with the irradiation lamp 52. Then, the image sensor 54 is activated to scan, in the main scanning direction, the white plate 51 eight times so as to produce eight sets of white level data. Each set of white level data includes 1648 pieces of white level data WA produced by the first through 1648-th CCDs. White level data, produced by a n-th CCD at a m-th scanning operation, will be indicated by mWAn ($1 \leq m \leq 8$, $1 \leq n \leq 1648$) hereinafter. For example, one set of white level data produced by the first scanning operation includes: white level data 1WA1, 1WA2, . . . , 1WA1648 which are respectively produced by the first through 1648-th CCDs. The eight sets of white level data are stored in the white level memory 73a in the manner shown in FIG. 8. It is noted that each white level data mWAn ($1 \leq m \leq 8$, $1 \leq n \leq 1648$) is constructed from one byte of data, for example.

Then, in S13, the irradiation lamp 52 is turned off, and the CPU 71 starts in S14 a black level data production process.

Figure 9:
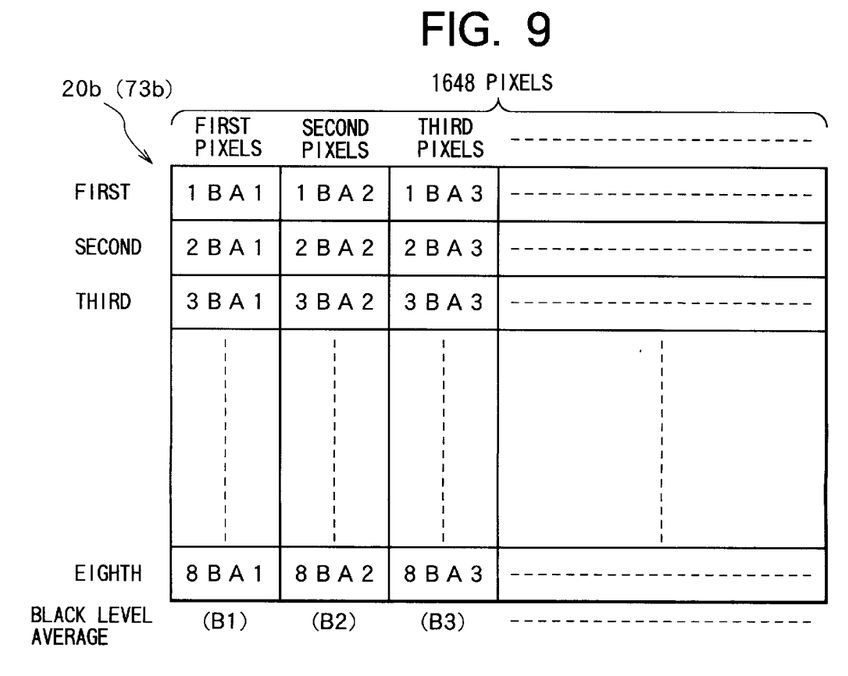
FIG. 9 illustrates eight sets of black level data produced by the eight scanning operations for a non-irradiated white plate.

As in the white level data production process, no original document 41 is fed in the transportation path during the black level data production process. However, the white plate 51 is not irradiated with light. Then, the image sensor 54 is activated to scan the white plate 51 eight times so as to produce eight sets of black level data. Each set of black level data includes 1648 pieces of black level data BA produced by the first through 1648-th CCDs. Black level data, produced by a n-th CCD at a m-th scanning operation, will be indicated by mBAn ($1 \leq m \leq 8$, $1 \leq n \leq 1648$) hereinafter. For example, one set of black level data produced by the first scanning operation includes: black level data 1BA1, 1BA2, . . . , and 1BA1648 which are respectively produced by the first through 1648-th CCDs. The eight sets of black level data are stored as shown in FIG. 9 in the black level memory 73b. It is noted that each black level data mBAn ($1 \leq m \leq 8$, $1 \leq n \leq 1648$) is constructed from one byte of data, for example.

Next, in S15, the DMA controller 74 starts transferring the eight sets of white level data and the eight sets of black level data one byte at a time to the host computer 10. As a result, the eight sets of white level data will be stored into the white level data memory 20a in the host computer 10 in the same manner as shown in FIG. 8. The eight sets of black level data will be stored into the black level data memory 20b in the same manner as shown in FIG. 9.

Then, the irradiation lamp 52 is turned on in S16, and the original transporting mechanism 40 successively feeds the original document 41 by a predetermined small amount of pitch in the auxiliary scanning direction along the transport path. Simultaneously, the image sensor 54 successively scans the original document 41 in the main scanning direction so as to produce successive sets of tone data GD. Each set consists of 1648 pieces of tone data produced by the first through 1648-th CCDs. Each set therefore represents tones of 1648 picture elements arranged on the original document 41 in the main scanning direction. Tone data, produced by a n-th CCD, will be indicated by GD(n) ($1 \leq n \leq 1648$) hereinafter. The DMA controller 74 transfers in S17 the thus produced successive sets of tone data one byte at a time to the host computer 10. The successive sets of tone data will be stored into the tone data memory 20c. Then, the program returns to S10.

Figure 7:
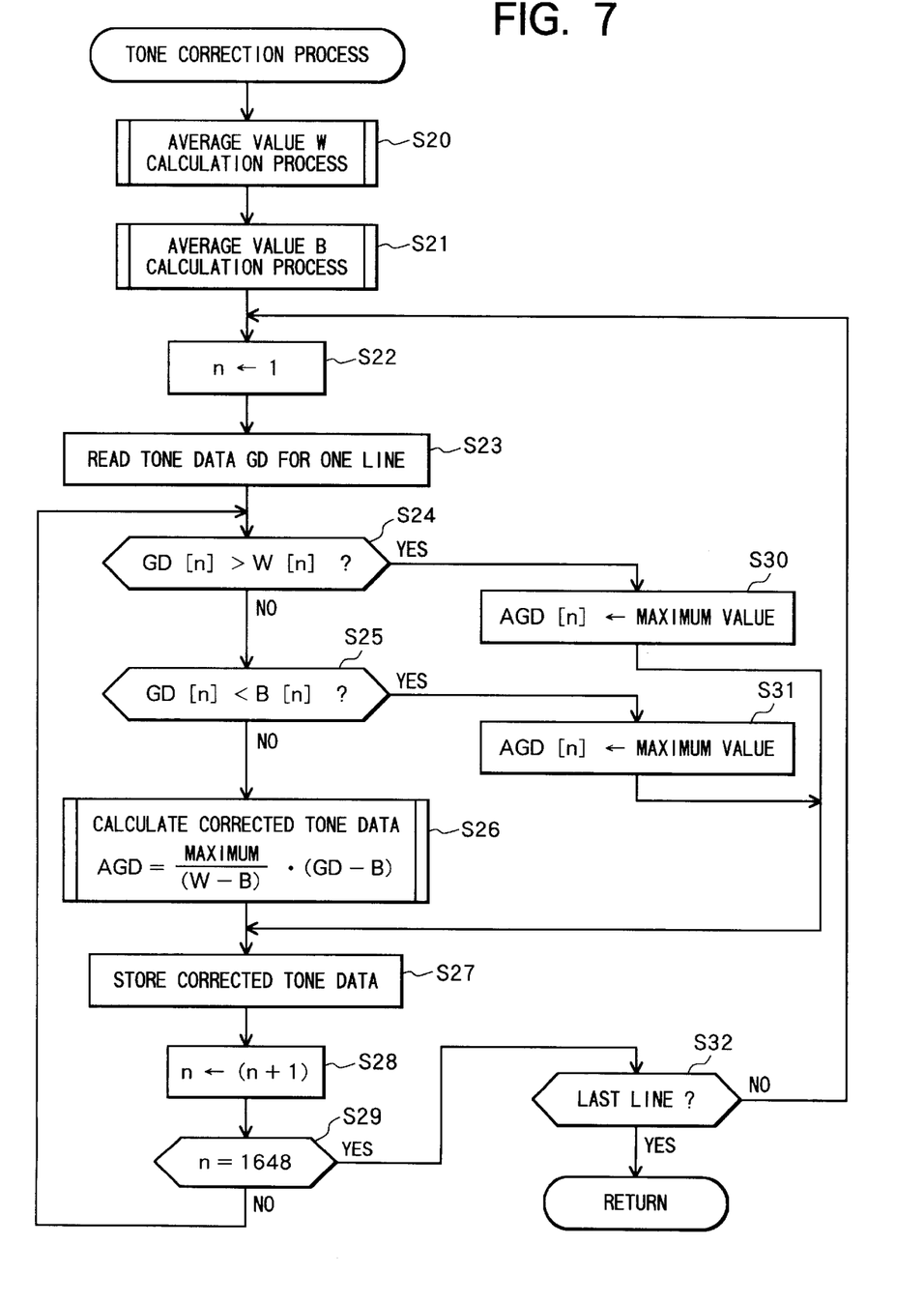
FIG. 7 is a flowchart of an image data correction operation conducted in the host computer.

Next, the control device 17 in the host computer 10 performs a tone correction control operation shown in FIG. 7. In this operation, each tone data GD(n) in each set is corrected into either one of 256 levels: 00, . . . FF. The value "00" is the lowest level, and the value "FF" is the highest level.

When this tone correction procedure starts, white average levels W1 through W1684 are calculated in S20 based on the eight sets of white level data. That is, eight pieces of white level data 1WA1, 2WA1, . . . , 8WA1, produced by the first CCDs at the first through eighth scanning operations, are first retrieved from the memory 20a. Then, two pieces of data representative of maximum and minimum values within the eight values are omitted from the eight pieces of data. Then, an average white level W1 is calculated for the remaining six pieces of white level data. In a manner similar to the one described above, average values W2, . . . , and W1684 are calculated for the second through 1684-th CCDs, respectively. Thus, 1684 white average values W(n) ($1 \leq n \leq 1648$) are obtained.

Next in S21, black average levels B1 through B1684 are calculated based on the eight sets of black level data. That is, black level data 1BA1, 2BA1, . . . , 8BA1, produced by the first CCDs at the first through eighth scanning operations, are first retrieved from the memory 20b. Then, two pieces of data representative of maximum and minimum values within the eight values are omitted from the eight pieces of data. Then, an average black level B1 is calculated for the remaining six pieces of white level data. In a manner similar to the one described above, average values B2, . . . , and B1684 are calculated for the second through 1684-th CCDs, respectively. Thus, 1684 black average values B(n) (1≦n≦1648) are obtained.

Then, a pixel counter n is set to 1 in S22. In S23, the first line's worth of tone data is retrieved from the tone data memory 20c. This set of tone data is constructed from 1648 pieces of tone data GD(n: 1≦n≦1648) produced by the first through 1648-th CCDs. Then, in S24, it is judged whether or not a subject tone data GD(n) (n=1 in this example) produced by the n-th CCD is higher than a white average value W(n). If the level GD(n) is higher than the white average value W(n) ("Yes" in S24), the tone data GD(n) is corrected in S30 into a corrected tone data AGD(n) which has the maximum value "FF." Then, in S27, the corrected tone data AGD(n) is stored in a predetermined area in the RAM 20 in correspondence with the count value n. Then, the pixel count value n is incremented by one in S28, and it is judged in S28 whether or not the count value n has reached 1648. If the count value has not yet reached the value 1648 ("No" in S29), S24 through S29 are repeatedly performed until S29 results in a positive determination.

If the level GD(n) is not higher than the white average value W(n) ("No" in S24) and if the level GD(n) is lower than the black average B(n) ("Yes" in S25), the tone data GD(n) is corrected in S31 into a corrected tone data AGD(n) which has the minimum value "00." Then, in S27, the corrected tone data AGD(n) is stored in the predetermined area in the RAM 20 in correspondence with the count value n.

On the other hand, if the level GD(n) is not higher than the white average value W(n) ("No" in S24) and the level GD(n) is not lower than the black average value B(n) ("No" in S25), the tone data GD(n) is corrected in S26 into a corrected tone data AGD(n) through a predetermined formula into either one of the 256 levels "00" to "FF." The formula is determined based on the white and black average values W(n) and B(n) as shown below.

$$AGD(n)=(FF)\times(GD(n)-B(n))/(W(n)-B(n))$$

Then, the steps S27 through S29 are performed in the same manner as described above.

When the value n reaches 1648 ("Yes" in S29), it is judged in S32 whether or not the presently-corrected one line's worth of tone data is for a last line of the original document. If the tone data is not for the last line ("No" in S32,) the steps S22 through S32 are repeatedly performed. If the tone data is for the last line ("Yes" in S32,) this process is terminated, and the program returns to the main routine.

Thus, in the present embodiment, the image scanner 30 produces in S12 white level data when the white plate 51 is irradiated with light. The image scanner 30 produces in S14 black level data when the white plate 51 is irradiated with no light. Correction data constructed from the thus produced white level data and black level data is transferred to the host computer 10 in S15. Next, the image scanner 30 produces tone data for the original document 41, and transfers the tone data to the host computer 10 in S17. In the host computer 10, the tone data is corrected into either one of the 256 levels "00" to "FF." This correction operation is attained with using average values of the transferred white level data and average values of the transferred black level data.

As described above, in the image scanner 30 of the present embodiment, the white plate 51 is provided traversing the entire width of the original transport path in the main scanning direction. Before an original document 41 is fed along the transport path, the white plate 51 is irradiated with light. The image sensor 54 scans the white plate 51 eight times to produce eight sets of white level data. Then, while the white plate is not irradiated with light, the image sensor 54 again scans the white plate eight times to produce eight sets of black level data. These eight sets of white level data and eight sets of black level data are transferred to the host computer 10. Afterward, an original document 41 is fed along the transport path, and the image sensor 54 successively scans the original document and produces successive sets of tone data. The image scanner 30 then transfers the tone data to the host computer 10.

In the host computer 10, white average levels W1–W1684 for the first through 1684-th CCDs are calculated based on the eight sets of white level data. Similarly, black average levels B1–B1684 for the first through 1684-th CCDs are calculated based on the eight sets of black level data. Then, tone data produced by the first through 1684-th CCDs for each line is corrected by the corresponding white and black average levels to be converted into either one of the 256 levels from "00" to "FF."

Thus, the image scanner 30 performs no calculation operations. The image scanner 30 can exclusively perform its reading operation to read the white plate 51 and the original document 41 and its transferring operation to transfer correction data and tone data. Accordingly, the reading speed and the transferring speed can be enhanced. Additionally, the tone data correction operation is performed in the host computer 10 which is constructed to accurately perform various calculations and processings within a short period of time. Accordingly, the tone data correction can also be performed accurately within a short period of time.

While the invention has been described in detail with reference to the specific embodiment thereof, it would be apparent to those skilled in the art that various changes and modifications may be made therein without departing from the spirit of the invention.

For example, in the above-described embodiment, the image scanner 30 is controlled to scan the white plate 51 eight times to produce eight sets of correction data. However, the number of times the image scanner scans the white plate 51 is not limited to eight. The number of scanning times can be varied dependently on: the size of the original document 41 to be read out; and the data processing ability of the host computer 10.

In the above-described embodiment, the image scanner 30 is controlled to produce not only white level data but also black level data. However, the image scanner 30 can be controlled to produce only white level data.

What is claimed is:

1. An image reading system for reading an original and producing tone data representative of the original, the system comprising:

an image scanner for reading an original and for producing tone data, the image scanner including:
  an image sensor capable of detecting a tone and of producing tone data representative of the detected tone;
  correction data production means for controlling the image sensor to read a predetermined tone and to produce correction data representative of the predetermined tone;
  original data production means for controlling the image sensor to read an original desired to be read and to produce tone data representative of the original; and data transferring means for transferring the correction data and the tone data; and a host computer for receiving the correction data and the tone data, the host computer including:

reception means for receiving the correction data and the tone data transferred from the image scanner; and correction means for correcting the tone data using the correction data.

2. An image reading system of claim 1, wherein the correction data production means controls the image sensor to read a white color plate and to produce white level correction data representative of the white tone.

3. An image reading system of claim 2, wherein the correction data production means controls the image sensor to read the white color plate a plurality of times and to produce a plurality of white level correction data representative of the white tone, the data transferring means transferring the plurality of white level correction data, the reception means receiving the plurality of white level correction data transferred from the image scanner, the correction means correcting the tone data using the plurality of white level correction data.

4. An image reading system of claim 2, wherein the correction data production means controls the image sensor to read the white color plate while the white color plate is being irradiated with light and to produce white level correction data representative of the white tone, the correction data production means controlling the image sensor to read the white color plate while the white color plate is irradiated with no light and to produce black level correction data representative of a black tone.

5. An image reading system of claim 4, wherein the correction data production means controls the image sensor to read the white color plate irradiated with the light a plurality of times and to produce a plurality of white level correction data representative of the white tone, and the correction data production means controls the image sensor to read the white color plate irradiated with no light a plurality of times and to produce a plurality of black level correction data representative of the black tone, the correction means correcting the tone data using the plurality of white level correction data and the plurality of black level correction data.

6. An image reading system of claim 1, wherein the image sensor is constructed of a plurality of image sensing elements, each sensing element being capable of detecting a tone of a corresponding pixel on the original and of producing tone data representative of the detected tone of the pixel, wherein the correction data production means controls each image sensing element to read a predetermined tone and to produce correction data representative of the predetermined tone, the original data production means controlling each image sensing element to read a corresponding pixel on an original desired to be read and to produce tone data representative of the original, and wherein the correction means corrects the tone data produced by each image sensing element using the correction data produced by the each image sensing element.

7. An image reading system of claim 6, wherein the correction data production means controls each image sensing element to read a white color plate and to produce white level correction data representative of the white tone.

8. An image reading system of claim 7, wherein the correction data production means controls each image sensing element to read the white color plate a plurality of times and to produce a plurality of white level correction data representative of the white tone, the correction means correcting the tone data produced by each image sensing element using the plurality of white level correction data produced by the each image sensing element.

9. An image reading system of claim 8, wherein the correction data production means controls each image sensing element to read the white color plate while the white color plate is being irradiated with light and to produce white level correction data representative of the white tone, the correction data production means controlling the image sensor to read the white color plate while the white color plate is irradiated with no light and to produce black level correction data representative of a black tone.

10. An image reading system of claim 9, wherein the correction data production means controls each image sensing element to read the white color plate irradiated with the light a plurality of times and to produce a plurality of white level correction data representative of the white tone, and the correction data production means controls each image sensing element to read the white color plate irradiated with no light a plurality of times and to produce a plurality of black level correction data representative of the black tone, the correction means correcting the tone data produced by each image sensing element using the plurality of white level correction data and the plurality of black level correction data produced by the each image sensing element.

11. An image reading system for reading an original and producing tone data representative of the original, the system comprising:

an image scanner for reading an original desired to be read and for producing tone data, the image scanner including:

an image sensor capable of scanning an entire width of an original along a main scanning direction and of producing a set of tone data representative of a tone on the entire width of the original;

correction data production means for controlling the image sensor to scan a white plate, which is provided to extend in the main scanning direction along the entire width of the original, and to produce a set of white level correction data representative of the white tone on the white plate along the main scanning direction;

original data production means for controlling the image sensor to scan the entire width of the original along the main scanning direction and to produce a set of tone data representative of the tone on the original along the main scanning direction; and data transferring means for successively transferring the set of white level correction data and the set of tone data; and a host computer for receiving the set of correction data and the set of tone data, the host computer including:

reception means for receiving the set of correction data and the set of tone data transferred from the image scanner; and correction means for correcting the set of tone data using the set of correction data.

12. An image reading system of claim 11, wherein the correction data production means controls the image sensor to read the white plate a plurality of times and to produce a plurality of sets of white level correction data representative of the white tone, the data transferring means transferring the set of tone data and the plurality of sets of white level correction data, the reception means receiving the set of tone data and the plurality of sets of white level correction data transferred from the image scanner, the correction means correcting the set of tone data using the plurality of sets of white level correction data.

13. An image reading system of claim 11, wherein the correction data production means controls the image sensor to read the white plate while the white plate is being irradiated with light and to produce a set of white level correction data representative of the white tone, the correction data production means controlling the image sensor to read the white plate while the white color plate is irradiated with no light and to produce a set of black level correction data representative of a black tone.

14. An image reading system of claim 13, wherein the correction data production means controls the image sensor to read the white plate irradiated with the light a plurality of times and to produce a plurality of sets of white level correction data representative of the white tone, and the correction data production means controls the image sensor to read the white plate irradiated with no light a plurality of times and to produce a plurality of sets of black level correction data representative of the black tone, the correction means correcting the set of tone data using the plurality of sets of white level correction data and the plurality of sets of black level correction data.

15. A method of reading an original and producing tone data representative of the original, the method comprising the steps of:
    controlling an image scanner to read a predetermined tone and to produce correction data representative of the predetermined tone;
    controlling the image scanner to read an original desired to be read and to produce tone data representative of the original,
    controlling the image scanner to transfer the correction data and the tone data to a host computer without correcting the tone data using the correction data; and
    controlling the host computer to correct the tone data using the correction data.

16. A method of claim 15, wherein the image scanner is controlled to read the desired original immediately after the image scanner is controlled to read the predetermined tone.

17. A method of reading an original and producing tone data representative of the original, the method comprising the steps of:
    controlling an image scanner, which is capable of scanning an entire width of an original along a main scanning direction and of producing a set of tone data representative of a tone on the entire width of the original, to scan a white plate, which is provided to extend in the main scanning direction along the entire width of the original, and to produce a set of white level correction data representative of the white tone on the white plate along the main scanning direction;
    controlling the image scanner to scan the entire width of the original along the main scanning direction and to produce a set of tone data representative of the tone on the original along the main scanning direction;
    controlling the image scanner to successively transfer the set of white level correction data and the set of tone data to a host computer; and
    controlling the host computer to correct the set of tone data using the set of white level correction data.

18. A method of claim 17, wherein the image scanner is controlled to scan the original immediately after the image scanner is controlled to scan the white plate.

19. A method of claim 18, wherein the image scanner is controlled to scan the white plate while the white plate is irradiated with light, further comprising the step of controlling the image scanner to scan the white plate while the white plate is irradiated with no light and to produce a set of black level correction data representative of the black tone on the entire width of the white plate, the image scanner being controlled to successively transfer the set of white level correction data, the set of black level correction data, and the set of tone data to the host computer, the host computer being controlled to correct the set of tone data using the set of white level correction data and the set of black level correction data.

20. A method of reading an original and producing tone data representative of the original, the method comprising the steps of:
    controlling an image scanner, which is capable of scanning an entire width of an original along a main scanning direction and of producing a set of tone data representative of a tone on the entire width of the original, to scan a white plate, which is provided to extend in the main scanning direction along the entire width of the original, and to produce a set of white level correction data representative of the white tone on the white plate along the main scanning direction;
    controlling the image scanner to successively transfer the set of white level correction data to a host computer;
    controlling the image scanner to scan the entire width of the original along the main scanning direction and to produce a set of tone data representative of the tone on the original along the main scanning direction;
    controlling the image scanner to successively transfer the set of tone data to a host computer; and
    controlling the host computer to correct the set of tone data using the set of white level correction data.

21. An image reading system for reading an original and producing tone data representative of the original, the system comprising:
    an image scanner for reading an original and for producing tone data, the image scanner including:
        an image sensor capable of detecting a tone and of producing tone data representative of the detected tone;
        original data production means for controlling the image sensor to read an original desired to be read and to produce tone data representative of the original; and
        data transferring means for transferring the tone data; and
    a host computer for receiving the tone data, the host computer including:
        reception means for receiving the tone data transferred from the image scanner; and
        correction means for correcting the tone data.

22. A method of reading an original and producing tone data representative of the original, the method comprising the steps of:
    controlling an image scanner to read an original desired to be read and to produce tone data representative of the original;
    controlling the image scanner to transfer the tone data to a host computer without correcting the tone data; and
    controlling the host computer to correct the tone data.

* * * * *